United States Patent [19]

Pedersen et al.

[11] Patent Number: 5,232,593
[45] Date of Patent: Aug. 3, 1993

[54] CARTRIDGE OF HOLLOW FIBER MEMBRANE WAFERS AND MODULE CONTAINING STACKED CARTRIDGES

[75] Inventors: Steven K. Pedersen, Burlington; Pierre L. Cote, Hamilton, both of Canada

[73] Assignee: Zenon Environmental Inc., Burlington, Canada

[21] Appl. No.: 845,641

[22] Filed: Mar. 4, 1992

[51] Int. Cl.$^5$ ............................................. B01D 63/00
[52] U.S. Cl. ...................... 210/321.78; 210/321.61; 210/321.79; 210/321.8; 210/321.87; 210/321.88; 210/321.89; 210/500.23; 156/292; 156/293
[58] Field of Search ............... 210/321.78, 321.79, 210/321.8, 321.87, 321.88, 321.89, 500.23, 321.6, 321.64, 321.72; 264/118; 156/292, 293

[56] References Cited

U.S. PATENT DOCUMENTS

| | | | |
|---|---|---|---|
| 2,972,349 | 2/1961 | DeWall | 210/321.8 |
| 3,342,729 | 12/1964 | Strand | 210/653 |
| 3,976,576 | 8/1976 | Jacobsen et al. | 210/321.8 |
| 3,993,816 | 11/1976 | Baudet et al. | 210/321.7 |
| 4,959,152 | 9/1990 | Nichols | 210/500.23 |
| 5,043,067 | 8/1991 | Sorensen | 210/321.8 |
| 5,104,535 | 4/1992 | Cote et al. | 210/321.8 |
| 5,143,613 | 9/1992 | Bitter et al. | 210/321.8 |
| 5,164,081 | 11/1992 | Nichols et al. | 210/500.23 |
| 5,174,900 | 12/1992 | Nichols et al. | 210/500.23 |

*Primary Examiner*—Robert A. Dawson
*Assistant Examiner*—Ana M. Fortuna
*Attorney, Agent, or Firm*—Alfred D. Lobo

[57] ABSTRACT

A module is disclosed for use as a membrane device, comprising, a shell with fluid couplings removably affixed to each of its ends and at least one non-disassemblable cartridge operably held within the shell. The cartridge is constructed from plural wafers sequentially coaxially aligned, each wafer consisting essentially of a generally planar frame and an array of hollow fibers of selectively permeable material adhesively held by their ends in opposed portions of the border of the frame, without potting the ends. Several cartridges may be coaxially "ganged" to provide the required filtration area. The cartridges may be removably disposed in the shell, or secured therein so that the entire module may be discarded when its efficiency is unacceptably low. The wafers are adhesively secured to define a fluid-tight conduit with open ends through which a feedstream is flowed transversely over the fibers. The bores of the fibers are in open fluid communication with the permeate zone in the shell. A frame of a wafer may be provided with longitudinal, laterally spaced apart grooves in its upper surface and the fibers trained in the grooves. A cartridge may be made by precoating a first frame with adhesive, embedding the fibers in the adhesive, initially curing the adhesive and then placing a second frame over the partially cured adhesive; and, repeating the steps. Alternatively, the second frame may be positioned over the embedded fibers on the first frame and the adhesive then cured. The arrays lie in a plane substantially orthogonal to the direction of flow of a feedstream to be treated, and fibers of one array are staggered relative to those in a successive array.

30 Claims, 8 Drawing Sheets

CARTRIDGE OF HOLLOW FIBER MEMBRANE WAFERS AND MODULE CONTAINING STACKED CARTRIDGES

BACKGROUND OF THE INVENTION

Though numerous embodiments of framed hollow fiber membranes (referred to as "fibers" for brevity) have been disclosed in this art, and much effort has been expended to provide a "wafer" or "cell" which can be assembled to form a module, the effort has not resulted in a cost-effective module which is reliable, rugged and has wide commercial applications. Prior art cells have sacrificed good exposure of the fibers for packing density by making wafers with bundles of fibers which are in contact with one another to a greater or lesser degree in some wafers compared to others; and, have made wafers with fluid passages in the sides of their frames.

This invention is specifically directed to a cartridge formed by repetitively adding repeating units, each unit consisting essentially of a unitary frame of arbitrary shape and an array of fibers; and, to a module containing a stack of cartridges. The term "repeating unit" is used because such a unit, per se, is difficult to handle and has little practical utility. Such a repeating unit is referred to as a "unitary wafer" to provide better visualization of the physical form of a repeating unit. We know of no prior art cartridge which has been constructed with such "unitary wafers".

A cartridge of unitary wafers was never successfully constructed prior to this time for a number of interrelated reasons, one of which was the high risk of not making a leak-proof cartridge; another was a preoccupation with the ability to replace a defective cell when necessary. Not the least of reasons was that it was not evident how a reliable and economical cartridge could be constructed with simplicity. Moreover, there is no intimation in the prior art of the far-reaching benefits of constructing a cartridge directly, without first constructing a single cell.

Conceptually, the effort in the art has been directed towards providing a single cell, then coaxially assembling plural cells, because it was logical to construct a single cell. A single cell can be handled and checked before being assembled in a module. But a different approach, namely, a concept directed to constructing a reliable and rugged cartridge without making individual cells, led to a solution of the problems in the prior art, namely providing a module with high efficiency and reliability at an affordable cost.

For example, Nichols in U.S. Pat. No. 4,959,152, states "Hollow fiber membranes may be conveniently mounted in annular or similar frames or retainers having a continuous perimeter and an open central portion. The fibers are strung across the open central portion of the frame and the ends are embedded in the retainer thereby forming a wafer. The ends of the fibers are exposed at the outside surface of the retainer, giving access to the interior of the fibers, while the outside surfaces of the fibers are accessible in the open central portion of the retainer." (see col 1, lines 57–66). Soon thereafter he states "Tight sealing of adjacent wafers is essential to avoid contamination of retentate and permeate." Though not explicitly stated, Nichols recognized the importance of sealing plural layers of fibers in each wafer effectively, because he constructed a device to centrifuge an epoxy resin of appropriately chosen viscosity and quick-setting characteristics, to generate a potting ring through which the ends of the fibers protrude to discharge fluid flowing through the lumens of the fibers.

The effectiveness of the centrifugal force however was not restricted to ejecting the epoxy resin radially outward to be deposited against the inner periphery of his mold; the centrifugal force also displaced the fibers in each layer resulting in uncontrolled spacing of fibers and "gaps" which invite channeling. To counter such displacement, individual fibers running parallel to each other in the weft direction in each layer, were woven together ("tied") with warp filaments to form a flat sheet; or, each layer of fibers was adhesively secured to a contiguous layer with a suitable adhesive-coated filament placed on the upper and lower surfaces, respectively, or both, of each layer (see col 4, lines 56–66). Tying fibers together results in chafing at the "ties" and premature rupture of the chafed fiber; and, in entrapment of solids in a "cage" formed by an axial zone between tied fibers.

By "axial" we refer to the central axis of a module, along which axis a multiplicity of arrays of fibers are assembled. For convenience and ease of reference in most of the drawings, the central axis is referred to as being in the vertical direction unless otherwise stated. The arrays of fibers are referred to as being in the lateral plane, one axis of which is referred to as horizontal, and a direction at an angle to the horizontal in the lateral plane is referred to as being transverse.

Our goal was to construct an assembly of coaxially aligned wafers in fluid-tight relationship near the peripheries of their frames, each wafer carrying but a single row ("monolayer") of parallel spaced apart fibers without tying them together or interconnecting them, or potting their ends. Yet we wished to secure the monolayer of fibers in fluid-tight spaced-apart relationship near their terminal portions, in opposed sides (or opposed portions of the border) of a frame having a central or off-set through-passage ("feed channel") for carrying a feedstream to be treated. The problem of confining those terminal portions had little in common with the problem so recently solved by Nichols, namely of securing multiple layers by forming inner and outer potting rings of centrifuged resin, and removing the outer one.

More than a score of years earlier, Strand in U.S. Pat. No. 3,342,729 had to use a mesh of fibers which he sandwiched between two extruded or cast frame members, formed from a suitable thermoplastic polymeric material. The reason he was forced to use a mesh was because such a configuration of meshed fibers had inherent stability. A multiplicity of individual, loose fibers do not have such stability. The stability afforded by the mesh is sufficient to allow the fibers (as a mesh) to be handled and positioned between the frame members. Strand did not suggest positioning individual fibers, in side-by-side relationship between the frame members nor could he have done so without envisioning the possibility of providing an essentially planar array of individual spaced-apart fibers between frame members. The fibers as a mesh, sandwiched between two frame members, is referred to as a "cell" in Strand's invention.

Strand suggested making a cell as follows: "A mesh membrane can be sandwiched between two such (frame) members and the assembly subjected to heat sealing conditions whereby a unitary, integral cell member is provided. This means has the added feature of readily and securely bonding the members into an intimate joined relationship, but additionally avoids the need for any adhesive and sealant material and the attendant setting or drying time. Means can also be provided simultaneously to heat-seal the ends of any fibers protruding beyond the outer edge of the joinder of the two frames by causing the material of the frame to flow over the joinder forming a smooth surfaced seamless edge. Care must be exercised that the hollow fibers are not materially altered in any portion where flow therethrough is desired. The frames can be made in pairs with mating male and female fittings such as lugs and indents to facilitate and assure alignment of the various matching openings. Rapid production of the cells can be achieved by the foregoing means." (see col 7, lines 12–30).

Strand's only description of the fabrication technique he used to form a cell, required a laminated frame constructed from two laminar portions, each having congruent elongated through-passages in each side. The upper surfaces of first laminar portions and the lower surfaces of second laminar portions within the periphery defined by the through-passages in the sides, are coated with adhesive such as an epoxy resin, and the mesh (which is cut slightly larger than the frame) is sandwiched in the adhesive between the upper and lower laminar portions until the mesh is securely and permanently bound to, and held between the laminar portions.

As did others before and after Strand, he suggested a "great number of membrane cells be stacked one above another with very small separations between them (and in some instances one upon another) to develop an extremely large transfer area . . . " (see col 4, lines 25-28). The function of the through-passages, or elongated perforations, in the sides of the frame was to provide multiple flow-channels for permeate, that is, the sides were "functionally perforate". In operation, channels for permeate must be sealed in fluid-tight relationship with the central through-passage ("feed channel") of the frame. Therefore, it was essential that there be no leakage of fluid through openings or channels in a "sealed zone" of any frame. The sealed zone of a frame is defined in the '729 patent as the annular zone adjacent a conduit formed by axially aligned multiple through-passages in an assembly of frames. The sealed zone includes (i) intra-frame space between a fiber and the frame in which it is held, as well as (ii) inter-frame space between successive frame members. The intra-frame space between the outer wall of the fiber and the frame (in which it is held) is sealed by filling it with adhesive which sets over the fibers. The inter-frame space in Strand's module may be sealed with a gasket member, particularly if the assembly, referred to herein as a "stack" of frames, is to be disassembled. The inter-frame space may be sealed with adhesive to non-displaceably secure each frame to a successive frame when there is no intention to disassemble the frames.

The problem we addressed was quite different from the one addressed by Strand. We sought to form a "cartridge" which could be "ganged" with other cartridges to form a "stack" in a module, using appropriate gasket means for disassembly of the cartridges, if desired. Preferably, neither the fibers in each array, nor those of adjacent arrays were to be touching when a cartridge was assembled, and their spaced-apart relationship was to be maintained, except during operation under near-extreme conditions, by essentially only the thickness of the frames in which the fibers were held. Each wafer was to consist essentially of an array of substantially coplanar, non-displaceable, individual, essentially linear fibers, supported in a preferably substantially coplanar unitary laminar frame having a continuous periphery (that is, no separation of the frame). There were to be no flow channels in the sides of the frame, that is, each frame was to be "functionally imperforate". Such perforations as might be provided within the borders of a frame would be solely to position or mount the frame within a shell of a module.

We sought to avoid tying fibers to one another intermediate their terminal portions, either to adjacent fibers in a specific array, or to adjacent fibers in an array above or below the specific array. Fibers in contact with each other not only decrease the effective area of a module of multiple wafers, but exhibit a proclivity to chafe against each other, thus damaging the walls of contacting fibers. Still further, we sought to avoid potting the ends of the fibers, and machining one centrifuged (outer) layer of resin in which the ends of the fibers are plugged, to expose another centrifuged (inner) layer of resin in which the ends of the fibers are not plugged, as in the Nichols' cell.

The significance and importance of securing loose, individual linear fibers in an array of coplanar fibers having generally parallel longitudinal axes, is better appreciated by referring to numerous prior art cells in which fibers are looped about a frame before their ends are secured by potting them. Even before Strand's invention teaching opposed headers in the periphery of each cell, Lewis et al in U.S. Pat. No. 3,198,335 taught a cell in which fibers were also secured in a "header" of the cell, in loops or "hanks", rather than individually, and at least one end of each loop was secured by being potted in resin to form the header. (see col 6, lines 16–30). The desirability of using loops in a cell construction having a header built into the cell was reiterated and refurbished twenty years later in an improvement by Ostertag in U.S. Pat. No. 4,440,641. In the construction of such cells, the fibers must be looped because there is no other means for holding them in place before they are potted. In the wafer we sought to construct we sought to provide no header, the open ends of fibers being so disposed as to communicate with an annular space outside the wafer.

In addition to coping with the problem of positioning a large number of fibers precisely before they are potted, there are numerous pitfalls in "potting" the terminal portions of fibers in a fluid resin which is to be solidified. To begin with, one must find a resin which is sufficiently compatible with the fibers as to form a fluid-tight bond which will survive over the useful life of the module. After having found such a resin one must make sure that movement of the fibers near the resin does not damage the fibers due to the shearing action of the solid resin on their terminal portions, particularly if the pressure differential to be used in the module is substantial. Further, cutting and dressing the solid resin to expose the ends of the fibers may result in plugging many of the fibers, and is to be avoided.

As if these problems were not enough, one must cope with the geometry of the frame which is to support each array of fibers, whatever the configuration of the array, in any assembly of arrays to be housed in a module.

Since we decided to forego potting the fibers we had to find a fast and effective technique for securing the terminal portions of the fibers. This required development of a technique for securing the terminal portions upon or within the border of the frame in such a manner as both, to position the fibers before they are bonded to the frame, and also to provide adequate support at the terminal portions so as to maintain the fibers in spaced-apart relationship relative to other fibers in the assembly.

The development of this technique resulted in the ability to make a cartridge of wafers in which all frame members are permanently sealed, successively, one to another.

In a "cartridge" which is constructed by sequentially assembling frames and monolayer arrays, the number of arrays "n" held between successive frames is one less than the number of frames in which the fibers are held, since a cartridge must begin and end with a frame, that is, there are "n + 1" frames; and n represents an integer 2 or greater, preferably in the range from 6 to 100.

It will be appreciated that, though the description of the invention herein is for "outside-in" flow of feed, the module containing a cartridge, or a stack of cartridges, may be equally well adapted for "inside-out" flow, for process considerations demanding such flow. By "outside-in" flow we refer to a feed flowing through the central feed channel in a cartridge or stack, so as to allow a portion of the feed to be separated as permeate. The portion separated as permeate flows from outside the walls of the membranes into their lumens. "Inside-out" flow is when the feed flows through the lumens of the fibers and the permeate is collected outside the membranes.

The cartridge, a module containing the cartridge or stack of cartridges, the method of constructing the cartridge, and the effectiveness of each of the foregoing in a variety of permeation processes, address the deficiencies of the prior art.

SUMMARY OF THE INVENTION

A novel and surprisingly effective cartridge has been discovered, comprising plural wafers, each comprising a single row of unpotted, coplanarly spaced-apart individual hollow fibers ("monolayer array") adhesively secured in the border of a unitary frame having a single through-passage for fluid. Producing a unitary cartridge (so termed because its component parts cannot be separated without damaging the cartridge), instead of individual cells, avoids the problems of the prior art instead of overcoming them, by virtue of the simple (in retrospect) but surprisingly effective construction of a cartridge of sequentially assembled plural wafers.

It has further been discovered that a "cartridge" having arbitrary dimensions may be formed by sequentially assembling plural wafers coaxially in fluid-tight relationship to provide only a single feed channel to be sealed. A cartridge or a stack of cartridges may be removably inserted in the shell of a permeation module; or, a cartridge or stack may be non-removably secured within the shell of a module. If the latter, the module is discarded when the efficiency with which it separates permeate from concentrate does not justify its continued operation.

It is therefore a general object of this invention to provide a cartridge of wafers each comprising a thin, unitary frame, preferably less than about five times the outside diameter of a fiber to be secured therein, having a central through-passage ("feed channel") defining a functionally imperforate border of the frame (or "sides", if the frame is polygonal), the frame having a continuous periphery within which a monolayer array of hollow fibers is secured by adhesively bonding terminal portions of the fibers in opposed portions of the border. Successive arrays are separated by the thickness of a single frame.

By "array" we refer to a multiplicity of substantially linear hollow fibers, individually secured in laterally spaced-apart coplanar relationship on the border, without stabilizing the fibers by interconnecting them to one another. The thickness of a preferably laminar frame is typically in the range from at least 0.5 times, up to about 5 times the outside diameter of a hollow fiber to be secured therein, and the fibers are circumferentially bonded to the border of the frame with enough bonding agent suitable for the purpose, so that not only is the circumference of each fiber in fluid-tight relationship with the frame on which it rests, but each frame bonds the next successive frame of the feed channel.

A cartridge or stack is operably disposed within a shell, with, or without through-passages for tie-rods (to mount the cartridge or stack in position). Such "rod through-passages" for mounting a cartridge or stack, if provided, have no function relating to channeling fluid, or separating any of its components, and in the context of the purpose of the module and each cartridge, are deemed non-functional perforations.

It is another general object of this invention to provide a module for use as a membrane device, comprising, a shell having entrance and exit passages, and at least one cartridge disposed within the shell, the cartridge comprising plural repeating units of sequentially constructed wafers; each wafer comprising a monolayer array of multiple, essentially linear hollow fibers of selectively permeable material, which fibers are not interconnected intermediate their terminal portions, but are coplanarly disposed across an axial feed channel and secured in opposed portions of a unitary frame, each frame having a continuous periphery; the feed channel is defined by coaxially aligned, abutting frames, each with a continuous, functionally imperforate border within which the fibers are secured, non-displaceably, near their opposite open ends which protrude through opposed portions of the outer periphery of the frame; the arrays being axially spaced apart by about the thickness of a frame; an entrance passage and an exit passage in the shell each communicates with the feed channel; and, the entrance and exit passages are each sealed from the feed channel.

It has further been discovered that, to provide an economical and commercially successful, low cost, low pressure shell for a module which accepts a high pressure feed, and includes a sufficiently high packing density of fibers for the purpose at hand, it is critical that a cartridge be formed without assembling individual 'stand alone' cells, but by constructing a unitary cartridge; that to do so within practical limits, each repeating unit in a cartridge be set in place, in fluid-tight relationship relative to the last prior repeating unit, within less than 5 minutes, preferably in less than 1 min, and most preferably within 20 secs.

It is therefore a general object of this invention to provide a module having a low cost, low pressure shell in which an assembly of coaxial wafers, in series, forms a fluid-tight conduit of sealingly abutted frames having axially aligned through-passages; in a preferred embodiment, to provide a feed which flows over the fibers of the arrays, in transverse flow; to provide a unitary non-disassemblable cartridge in which individual fibers are essentially linear and secured under suitable tension irrespective of their length by opposed portions of the unitary frame, are unsupported within the array except near their ends, and the ratio of outside diameter to length of the fibers is chosen as a function of the hydrodynamics of the feed; and, to provide a cartridge in which one or more arrays are oriented transversely to the fibers in adjacent arrays in the cartridge.

It is a specific object of this invention to provide a simple method for securing plural fibers in a cartridge by bonding an array of fibers with bonding means, preferably a fast-acting synthetic resinous adhesive, in the border of a frame. A first frame is positioned to receive an array of fibers; all the fibers in an array are held in suitable fiber-positioning means such as clamps, and trained in coplanar, parallel, spaced-apart relationship onto opposed portions of the frame's border; a second frame is placed on the array; and, a fluid adhesive confined between the first and second frames is cured so that the terminal portions of the fibers are held in fluid-tight relation between the first and second frames; and the steps are repeated until the desired number of arrays are provided in the cartridge; then an end cap or finishing frame is placed on the last-positioned array and adhesively bonded to it.

Preferably each frame is provided with plural longitudinal, laterally spaced apart grooves therein, one fiber for each groove, and the fibers are held under slight tension in the grooves, with the ends of the fibers overhanging the periphery of the frame. If the open ends of the fiber protrude too far from the outer periphery of the frame and overhang it, they are severed close to the frame.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
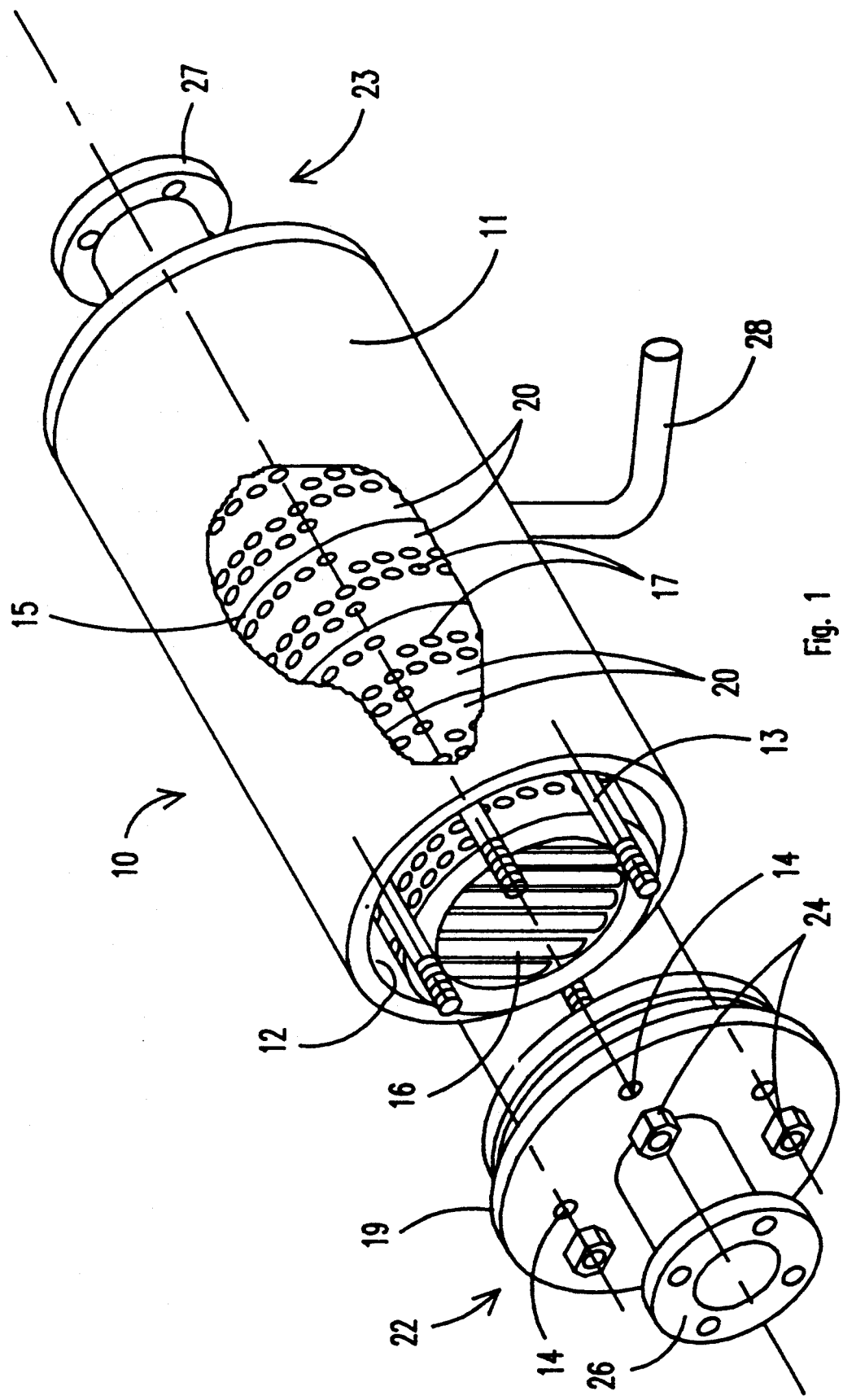
FIG. 1 is a perspective view of a module with portions broken away and exploded, showing more than four cylindrical cartridges stacked coaxially in a cylindrical shell, each cartridge constructed by sequentially forming wafers, each with an annular laminar ring frame ("ring frame" for brevity), with no tie-rod passages in the ring frame for mounting the cartridges; and successive wafers are radially displaced 60° relative to each other.

The module of this invention may be used in a fluid-fluid fractionation process of choice, and more generally, in various separation processes. The module is especially well adapted for use in ultrafiltration, reverse osmosis, and gas permeation processes; it may be used for dialysis, especially as an artificial kidney, for direct osmosis, gas-gas exchanges and liquid-gas exchanges such as pervaporation.

The cartridge may be tailored to provide a predetermined pressure drop of feed; and, the bores of fibers in the arrays may be tailored to provide a predetermined resistance in the flow path of permeate.

The frames of each cartridge are preferably of identical dimensions and may be constructed of any material which is bondable to the fibers and is non-reactive to the components of the feed. The side of a frame, in elevational cross section in a plane perpendicular to the plane of the frame's upper surface, may be of arbitrary shape, but is preferably rectangular; and in plan view, the periphery of a frame may be of arbitrary shape (e.g. arcuate or linear) but is preferably circular or square; but each of plural frames is of identical shape so as to form, when assembled with other wafers, a cartridge which is preferably either cylindrical or parallelepiped.

When a stack is to be enclosed in the shell of a module, the stack is positioned in the shell, longitudinally, coaxially between fluid-tight gaskets between cartridges. The stack is preferably held in the shell with tie-rod mounting means which traverse the axial length of the assembly. When plural cartridges are mounted in the shell, the longitudinal axis of each cartridge may be horizontally or vertically displaced relative to the longitudinal axis of the shell.

The fibers used in an array may be formed of any conventional membrane material whether inorganic, organic, or, mixed inorganic and organic. Typical inorganic materials include glasses, ceramics, cermets, metals and the like. Ceramic membranes may be made, for example, as described in U.S. Pat. Nos. 4,692,354 to Asaeda et al (class 472/ subclass 244), 4,562,021 to Alary et al (class 264/subclass 43), and others. The organic materials are typically polymers, and are preferred, whether isotropic, or anisotropic with a thin layer or "skin" on either the bore side or the shell side of the fibers. Preferred materials for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein.

The fibers are chosen with a view to performing their desired function and are non-randomly oriented in each array, and in the module, so that the flow of feed through the module is over the fibers and orthogonal thereto so as to be in transverse flow as disclosed in "Designing Hollow Fibre Contactors" by Mung-Chien Yang and E. L. Cussler in *AIChE Jour.*, 32: 1910–1916 (1986).

For hollow organic fiber membranes, the outside diameter of a fiber is at least 100 $\mu$m (microns) and may be as large as about 3 mm, typically being in the range from about 0.4 mm to 2 mm. Ceramic/metallic tubular membranes have an outside diameter in the range from about 3 mm to about 13 mm. The larger the outside diameter the less desirable the ratio of surface area per unit volume of module. The wall thickness of a polymeric organic fiber is at least 10 m$\mu$ and may be as much as 1 mm, typically being in the range from about 5% to about 40% of the outside diameter of the fiber.

The average pore cross sectional diameter in a fiber may vary widely, being in the range from about 5 to 2000 Å. The preferred pore diameter for separation of components in a liquid feedstream is in the range from about 10 to 200 Å.

The diameter of a fiber in an array will depend upon the effective inside diameter of the wafer (i.e. length of fiber), strength of the fiber material, the flow rate of feed over the fibers and the pressure of the feed, its temperature, and other considerations. Since the fibers are unsupported by a frame member except near their ends, the fibers are relatively short being in the range from 5 cm to about 0.5 meter.

Referring to FIG. 1, there is schematically illustrated a module, in perspective view, with portions broken away, indicated generally by reference numeral 10, received within a relatively close-fitting cylindrical shell 11 to show a stack of cylindrical cartridges 20 coaxially held therewithin by tie-rods 13 having threaded ends. The tie-rods, which are equidistantly spaced along the circumference of the stack, traverse the length of the shell and the cartridges are slidably fitted therein with gaskets 15 between successive cartridges. Each cartridge is made with from 10 to 50 arrays, each array having at least 2, preferably from 15 to 500, fibers 16, the bores 17 of which discharge permeate in a plane orthogonal to the longitudinal axis of the module.

The shell 11 may be formed from a synthetic resinous material adapted to withstand the pressure at which feed is to be treated. The shell has an inner end surface 12, only one end of which is visible, which is preferably smooth. The tie-rods 13 extend from the end of the shell and protrude through a stepped flange 19 of coupling 22 with O-rings (not shown) to seal between the tie-rods and the stepped flanges. The stepped flange 19 is molded or machined with highly finished surfaces, the step being dimensioned to fit inside shell 11 in fluid-tight engagement and against the end face of the first cartridge of the stack. The ends of the tie-rods are threaded so as to allow the stepped flange 19 to be through-bolted with nuts 24, tightly compressing the upper and lower faces of every cartridge in the assembly, one against the other, or against a gasket, in fluid-tight relation.

Essentially identical fluid couplings 22 and 23 at the ends of the shell serve to direct the flow of a feedstream over the fibers within the stack. The tie-rods 13 and nuts 24 serve to provide enough pressure on the assembly comprising the shell 11, fluid couplings 22 and 23, and the stack of cartridges 20, to confine the feedstream within the stack. Through-passages 14 are provided in coupling 22 to receive the tie-rods 13.

An O-ring (not shown) provides a fluid-tight seal between the coupling 22, especially the stepped flange 19, and the surface 12 inside the shell 11, to ensure that no portion of the permeate leaks over the exterior of the shell. Another gasket (not shown) provides a seal between the inner face of the coupling and the cartridge at each end of the stack, preventing the feedstream from leaking into the permeate side. The two fluid couplings 22 and 23 are provided with flanges 26 and 27, respectively, for attachment to appropriate fluid conduits which deliver the untreated feedstream, and lead away the treated feedstream or concentrate. A permeate outlet from the shell is indicated at 28.

The module in the form shown in FIG. 1 is particularly well-adapted for use in a filtration operation. Fluid feed under elevated pressure in the range from about 120 kPa (3 psig) to about 5000 kPa, is introduced through coupling 22 to flow transversely over the fibers in the stack. Feed may enter at subatmospheric pressure if the permeate is removed under vacuum. Components of the feed capable of passing through the membranes under the transmembrane pressure generated, permeates through the walls of the fibers and into the permeate side of the shell, and leaves through permeate outlet 28, while the remaining components of the feedstream (the concentrate) leave through the coupling 23.

Since the length of fibers in an array is necessarily relatively short because they are unsupported by a frame member except near their ends, one skilled in the art is driven to use as long a fiber as one can. This is particularly true in those instances where the ratio of membrane area to the volume in which they are held (the flow-through zone provided by the conduit within the stack) is to be maximized for minimum cost.

The width of the border of a frame is sufficient to provide adequate support for, and negate damage to, the terminal portions of the fibers when subjected to the force of the incoming feedstream and to meet the structural requirements of the module. Each section may be from about 10 mm to about 50 mm wide; its thickness depends upon the outside diameter of the fibers, and if the frame is to be grooved. Preferably, if ungrooved, from 0.5 to 3 times fiber o.d.; if grooved, from 1.5 to 5 times fiber o.d. Organic fibers are typically made with an outside diameter in the range from about 400 $\mu$m to about 2 mm, and wall thickness ranging from about 5 microns to about 2 mm; these dimensions are larger for ceramic fibers.

The void space within a stack may range from about 20% to about 95% of the internal volume of the central conduit through the stack, the void space depending upon the particular end use of the stack in a module. The packing density in a module is defined by membrane area per unit internal volume of module and has dimensions of inverse meter ($m^{-1}$).

In a module containing X cartridges each with Y wafers, with fibers of different outside diameter (o.d.) at different center-to-center lateral spacing but the same center-to-center transverse spacing, the packing density in a module varies as illustrated in the following examples. In each case, each wafer has an array of 72 fibers, has an o.d. of 188 mm, an inside diameter (i.d.) of 155 mm, and a center-to-center transverse spacing of fibers of 2 mm.

TABLE I

| Ex. | Fiber diam. mm | Wafer thk. mm | C'ter - c'ter lateral spacing | Packing density $m^{-1}$ | Void frac.* |
|---|---|---|---|---|---|
| 1 | 0.7 | 1.8 | 1.8 | 364 | 0.89 |
| 2 | 1.0 | 2.1 | 2.1 | 446 | 0.81 |
| 3 | 1.5 | 2.7 | 2.7 | 520 | 0.58 |

*void fraction in the central conduit of the cartridge

In an array, the center-to-center spacing of fibers in the horizontal plane ranges from about 1.2 to about 5 times the outside diameter of a fiber. The void fraction in the central conduit of the cartridge will vary in the range from about 0.3 to about 0.9, typically in the range from 0.4 to 0.8. The choice of fiber spacing and thickness of frame will determine packing density of the fibers. Such density is chosen to provide the maximum membrane area per unit volume of module without adversely affecting the flow of the feedstream through the stack. The result of forming a stack of cartridges and feeding the feed across the fibers is that permeate is discharged in opposite directions from the bores of fibers while the concentrate is discharged longitudinally through the module.

The length of the terminal portion of a fiber held in the frame's border will typically range from about 0.5 cm to about 5 cm, preferably from about 1 cm to about 2.5 cm, depending upon the diameter and length of the fiber between opposed portions of the border, inter alia. A fiber 0.7 mm in diam. and 10 cm long may be held by terminal portions 1 cm long near each end. A fiber of the same diameter and 50 cm long may be held by terminal portions 2.5 cm long near each end, or by only 1 cm. From about 5% to about 50% of the overall length of a fiber may be used to secure the fiber, chord-wise, in each opposed portion of a border of a frame.

It will now be evident that a stack of cartridges, bonded or gasketed one to another, seriatim, form an elongated conduit having a wall thickness which is determined by the width of the border of the frames and not the thickness of a frame. Such a frame, though relatively thin, is rigid in that, when on edge, it can only be bent around an axis which lies in the plane of the frame. The conduit is therefore able to withstand high hydraulic pressure exerted by the feed.

Unless a module is constructed with a stack in which the fibers of at least some arrays are deliberately always in contact with fibers in a next-adjacent array, fibers in successive arrays are preferably essentially free from contact, not only with one another in the same array, but with fibers in an adjacent array. In a preferred embodiment, it is only during a module's operation, under flow conditions which cause the fibers to sag, that there may be contact between fibers in adjacent arrays, which thus support each other.

The particular method of bonding the fibers to the frame is not narrowly critical, the choice being dependent upon the materials of the frame and the fiber, and the cost of bonding. Use of a compatible adhesive mainly ensures that the mechanical grip exerted by opposed grooves around a fiber, is fluid-tight.

Figure 2:
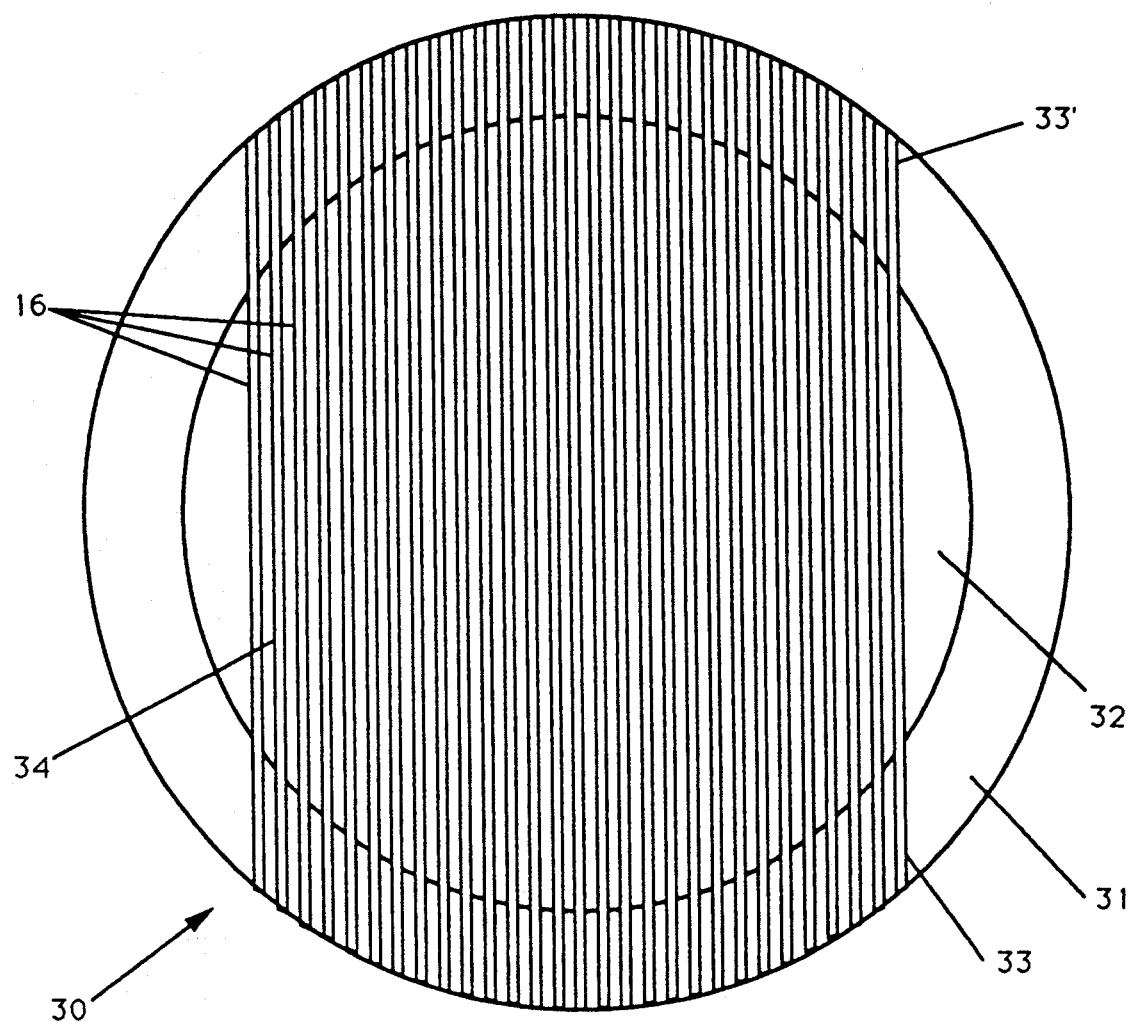
FIG. 2 is a plan view illustrating a repeating unit of the cartridge, namely a wafer having an imperforate ring frame with individual grooves to accommodate each fiber of an array secured across the feed channel defined within the border of the frame.
Figure 3:
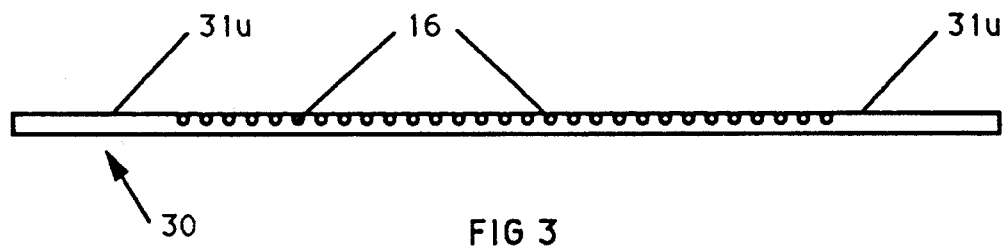
FIG. 3 is an end elevational view showing that the fibers are held in the grooves with the upper surfaces of the fibers essentially coplanar with the upper surface of the frame.

Referring to FIG. 2, there is shown a wafer indicated generally by reference numeral 30, having an annular frame in the form of laminar ring 31 which borders a through-passage 32. The ring is provided with directly aligned opposed sets of half-pipe grooves 33 and 33' in the ring's upper surface 31u (see FIG. 3) the grooves being chord segments adapted (see FIG. 2) to snugly accommodate an array 34 of a multiplicity of fibers 16 which are coplanarly disposed in laterally spaced apart relationship in the sets of grooves 33 and 33' in the upper surface 31u. The ends of the fibers protrude through opposed points in the periphery of the opposed portions of the border, to allow the bores 17 to discharge permeate.

The lower (or bottom) surface 31b of the ring is ungrooved. The depth of the groove is preferably about the outside diameter of a fiber so that the upper surface of the fiber is substantially coplanar with the upper surface 31u. The depth is not narrowly critical; it can be less than the diameter of the fibers since the fibers are compressible; or it can be more than the diameter of the fibers since adhesive will fill the space above the fibers.

To place the fibers 16 in the grooves 33 and 33' of the ring 31 they are held by their ends in a clamping means which is preferably grooved with corresponding grooves to facilitate positioning the fibers in the upper surface 31u. The upper surface 31u is pre-coated with a quick-curing adhesive (not shown) before the fibers are placed in the chord-wise grooves, and when the fibers are placed in the grooves, they are coated with more adhesive. The adhesive is chosen to cure initially to a semi-rigid, compressible mass sufficiently rigid to hold the fibers in their grooves until the next ring is positioned. Such initial cure is preferably effected within less than 1 min, preferably less than 10 secs, and typically essentially instantaneously in less than 1 second, by a fast-acting initiator which generates free radicals, such as exposure to a source of ultraviolet (UV) light of sufficient intensity to cure the adhesive and secure the fibers in their respective chord-wise grooves.

The clamping means are then released, and another ring 31 is placed over the just-adhesively secured fibers, and the step of positioning another array of fibers is repeated.

Figure 4:
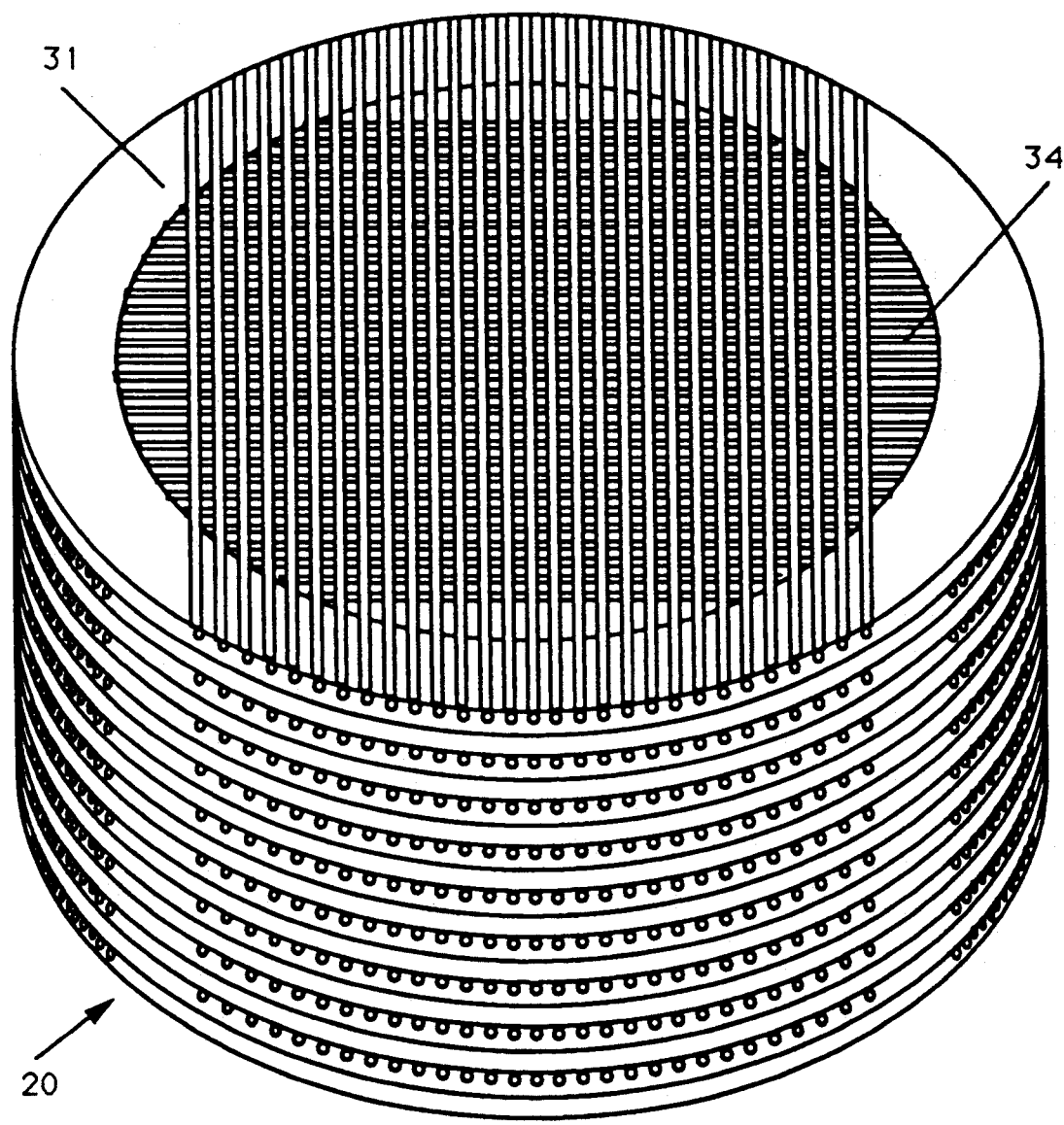
FIG. 4 is a perspective view of a cartridge from FIG. 1 as the cartridge is being constructed but without the last frame which is to overlie the uppermost array; except the fibers in one array are shown 90° radially displaced relative to those in an adjacent array.
Figure 6:
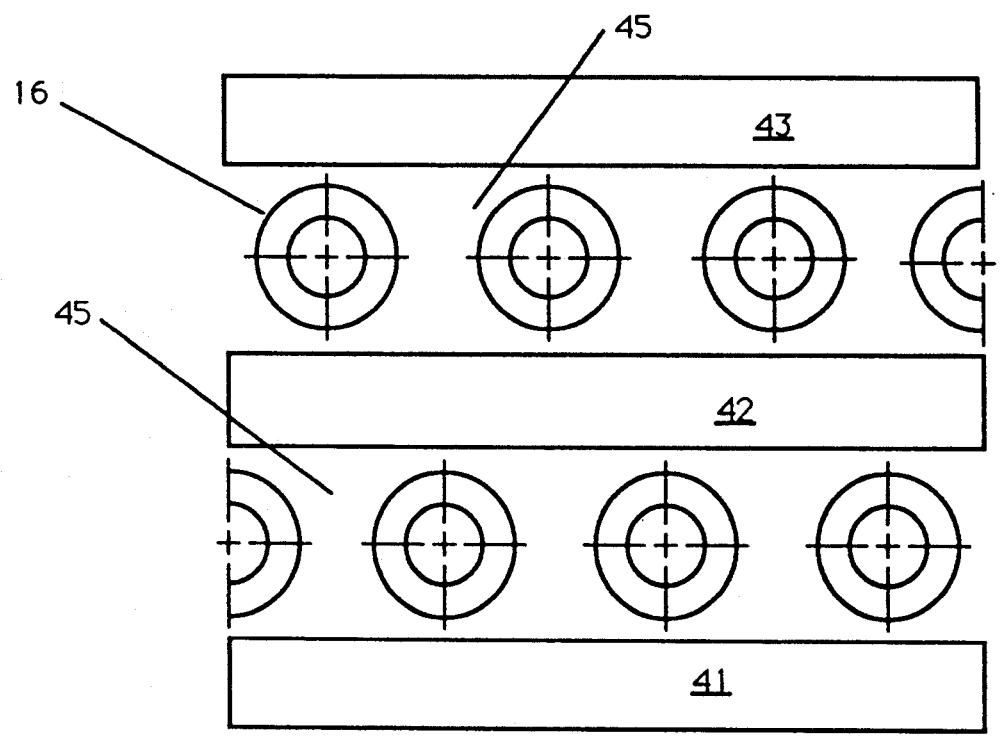
FIG. 6 is a detailed elevational view much enlarged, of a portion of the circumferential surface of a cartridge constructed with ungrooved upper and lower surfaces, showing they are adhesively bonded with a prelaid layer of adhesive about as thick as, or thicker than the diameter of a fiber; the fibers in successive arrays are staggered laterally relative to one and another so that the fibers from one array are not directly above those in a successive array.

Referring to FIG. 4, there is shown a single cartridge during construction, specifically to illustrate how the arrays of successive wafers are staggered relative to one another so as to contact fluid flowing through the through-passage more efficiently. As indicated, they are radially displaced relative to one another, but they could be laterally displaced in vertically spaced apart relationship, as shown in FIG. 6.

Figure 5:
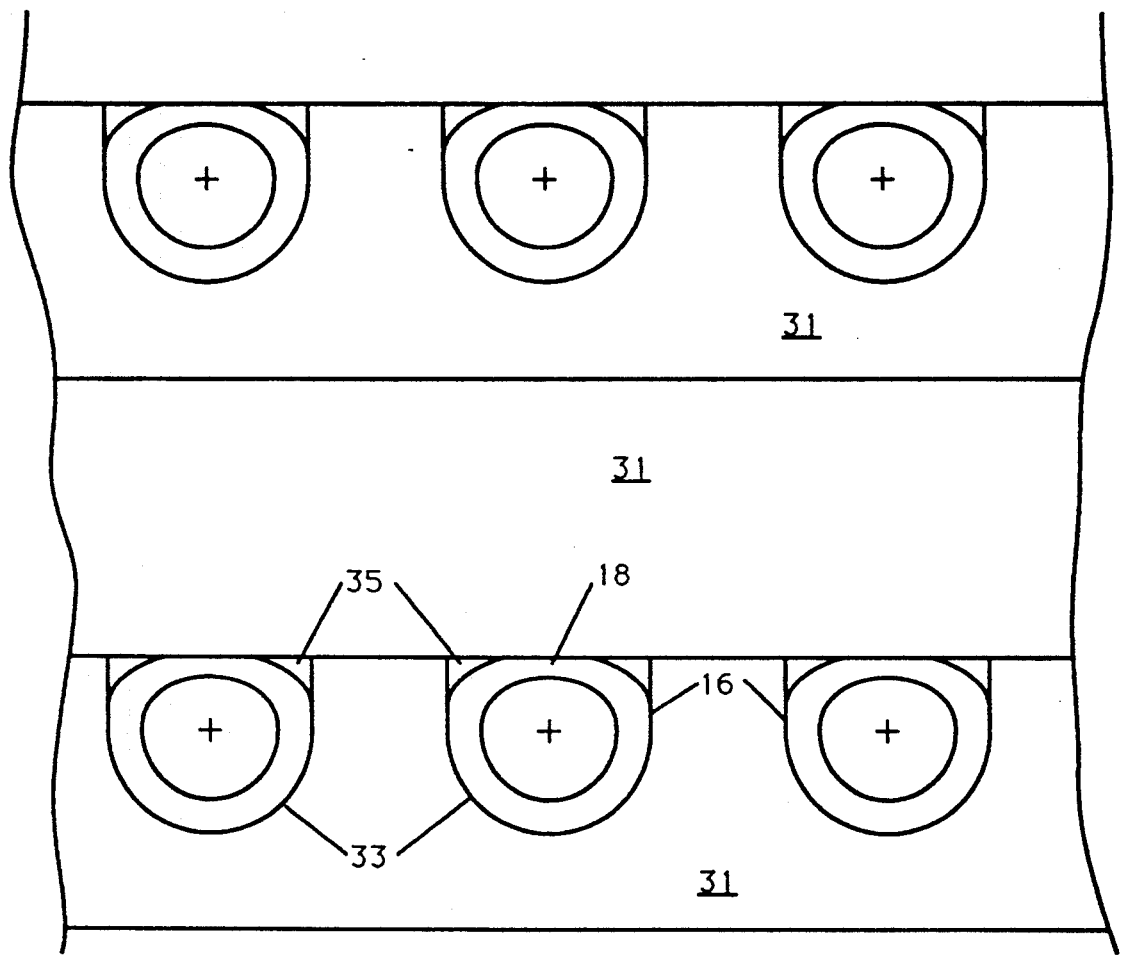
FIG. 5 is a detailed elevational view much enlarged, of a portion of the circumferential surface of the cartridge shown in FIG. 4.

As illustrated in FIG. 5 in a portion of the front surface of the cartridge shown in FIG. 4, greatly enlarged detail, the grooves 33 have fibers 16 placed and held therein by adhesive 35, and the walls 18 of fibers are slightly compressed by the next succeeding ring without significantly restricting the inside diameter.

It is desirable to minimize the thickness of the frames 31 to minimize the vertical spacing between successive arrays, but practical considerations relating to injection molding, or otherwise forming the frame from a suitable resin, and weakening of the strength of the ring, dictate that the frame be at least about 50% thicker than the outside diameter of a fiber to be held therein. The materials for the frames of a wafer may be inorganic but are preferably either thermoplastic or thermosetting synthetic resinous materials, optionally reinforced with glass fibers, boron or graphite fibers and the like if great strength is desired. Thermoplastic materials derived from a monoolefinically unsaturated monomer, are preferred for relatively low temperature service below 100° C., these being chosen so as to be sufficiently compatible with the material of the fibers to produce a lasting, fluid-tight bond. Such thermoplastic materials may be crystalline, such as polyolefins, particularly high density polyethylene, polyamides (nylon), polycarbonates and the like, semi-crystalline such as polyetherether ketone (PEEK), or substantially amorphous, such as poly(vinyl chloride) (PVC) and the like. Other useful commercially available materials are polypropylene, acrylo-nitrile-butadiene-styrene ("ABS"), polyacetal, polyesters and modified or blended polyphenylene oxide (PPO).

In a manner analogous to that described hereinabove it will now be evident that an elliptical, rectangular or other polygonal frame may be constructed and provided with an array.

Ungrooved rings having a thickness from about one-half (0.5) to about one and one-half (1.5) times the outside diameter of a fiber may be used with relatively little concern for their strength. In an embodiment of a cartridge, a portion of the front surface of which is illustrated in FIG. 6 in greatly enlarged detail, the smoothly planar face of lowermost ring 41 is coated with a layer of adhesive 45 thicker than a fiber 16, and fibers are spaced apart and held until a successive (next lowermost) ring 42 is placed and pressed onto the adhesive which is then cured. More adhesive is then applied to the upper surface of ring 42, another array is held in place in the adhesive, and another ring 43 is pressed onto the upper surface of the adhesive in which the fibers are embedded. It is not narrowly critical how much pressure is applied so long as the effective internal cross-sections of the fibers are not significantly decreased.

Figure 7:
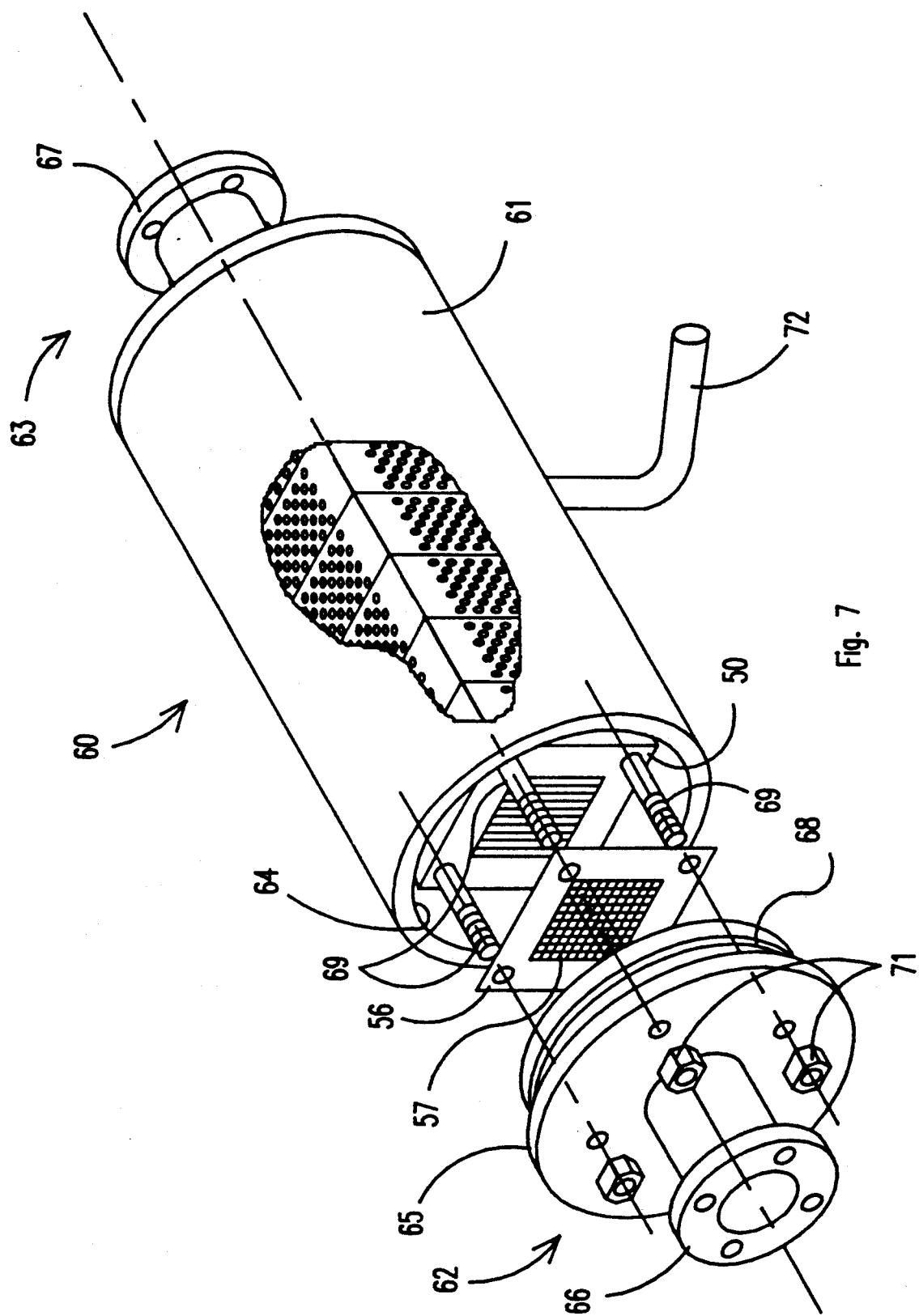
FIG. 7 is a perspective view of a module with portions broken away and exploded, showing more than four (4) square cartridges stacked coaxially in a cylindrical shell, each cartridge having through-bores for positioning it in the shell; each cartridge is constructed by sequentially forming wafers, each with an annular laminar square ring frame with tie-rod passages in the disc frame for mounting the cartridges; and fibers in successive wafers in each cartridge are radially displaced 90° relative to each other.

In FIG. 7 there is shown a module 60 in which is mounted a stack of rectangular cartridges 50. In a manner analogous to that described in FIG. 1, the module is provided with a cylindrical shell 61, and flanges 66 and 67 on couplings 62 and 63, respectively, between which the stack is held. The inner diameter of the shell is preferably just larger than the diagonal of a cartridge but the inner surface 64 of the shell does not need to guide the cartridges into position. A gasket 68 provides a seal between the coupling 62 and the end of shell 61. The cartridges are mounted by passing tie-rods 69 through passages in the corners of the cartridges. Threaded ends of the tie-rods project through stepped flange 65 which is secured in position with nuts 71. A screen 56 with a mesh interior 57 is provided at the feed end of the module to filter out large particles. Feed is introduced through coupling 62, concentrate leaves through coupling 63, and permeate leaves through outlet 72.

It will now be appreciated that another module, analogous to the one shown in FIG. 7 (say), may be used as a mass transfer device to perform fluid-to-fluid transfer operations between any appropriately chosen first fluid flowing through the lumen of the fibers 16, and another appropriately chosen second fluid flowing through the stack externally to the fibers, provided the module is also fitted with an inlet (not shown) for the first fluid. The outlet for the first fluid is furnished by the permeate outlet 28 of the module. To force the first fluid to flow through the lumen of the fibers, appropriate fluid-tight seals are provided between the inside surface of the shell and the periphery of the stack of cartridges.

Figure 8:
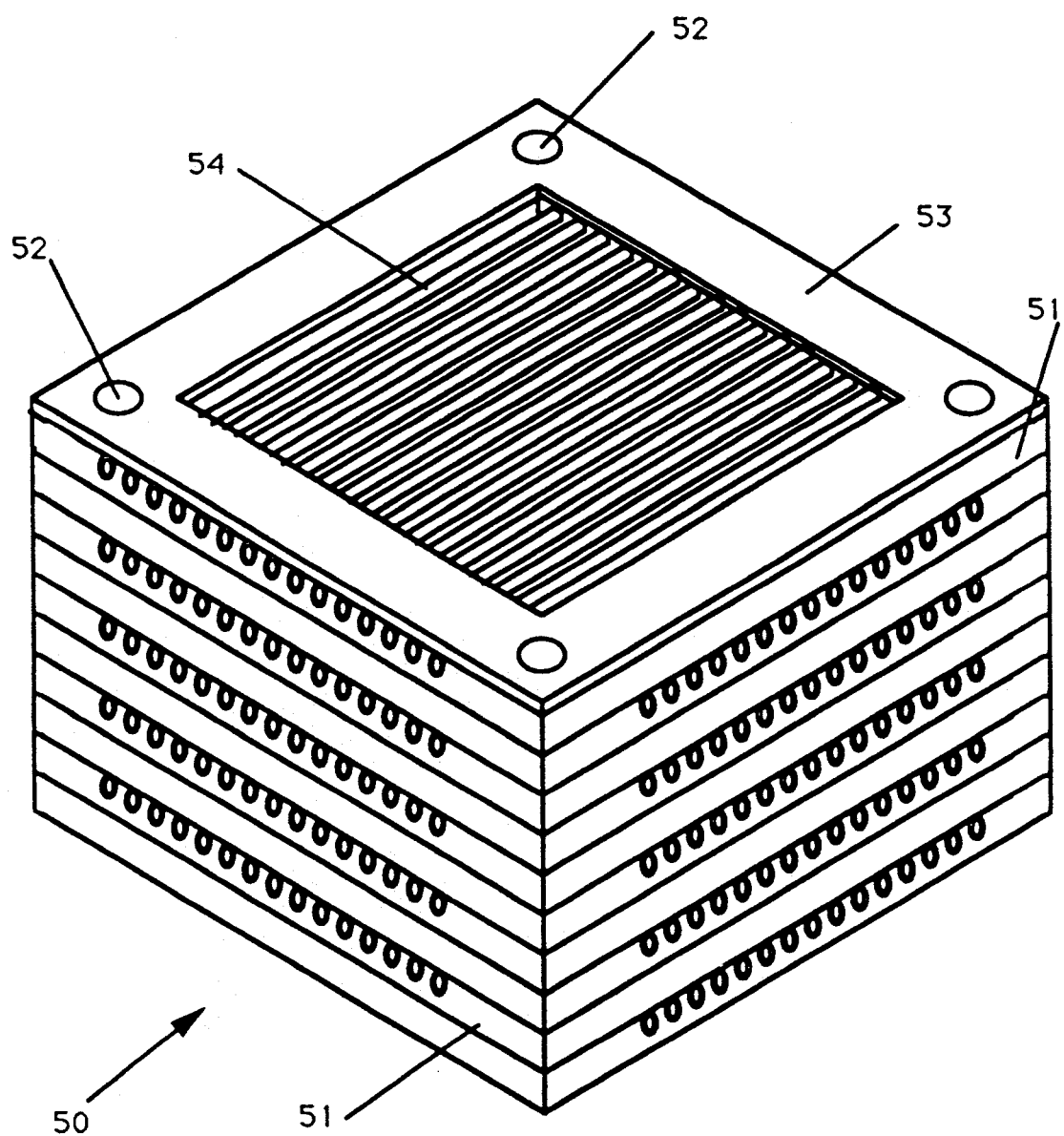
FIG. 8 is a perspective view of a rectangular cartridge with tie-rod mounting passages.

Referring now to FIG. 8 there is illustrated a completed rectangular cartridge 50 constructed with ten (10) grooved rectangular frames 51 with tie-rod passages 52. Arrays 54 are held in the frames, successive arrays being at right angles to each other. The topmost (end) eleventh frame 53 is ungrooved.

Figure 9:
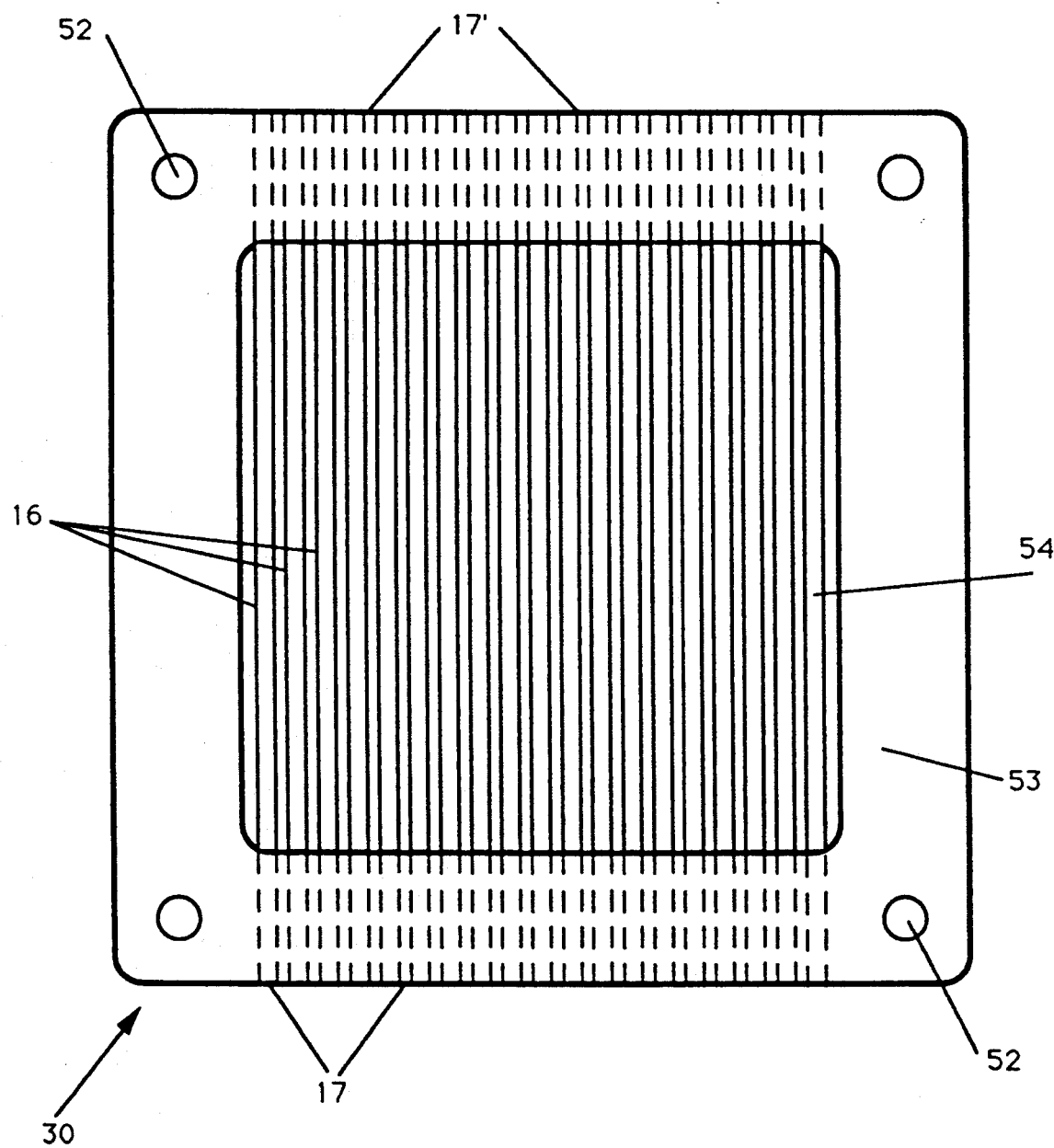
FIG. 9 is a plan view of the cartridge shown in FIG. 8, showing the uppermost array of fibers held between the topmost (or top end) ungrooved cover frame, and the next successive grooved laminar frame.

Referring to plan view shown in FIG. 9 of the cartridge of FIG. 8, it is seen that permeate leaves through opposed bores 17 and 17' of fibers 16 in opposed portions of the border of the uppermost frame 53. The next array discharges permeates at right angles to the directions in which permeate from the topmost array is discharged with the result that permeate is discharged in four directions, two vertically and two horizontally, from a cartridge.

Preferred adhesives are U-V (ultraviolet) light curable resins such as Dymax 186m polyvinyl ethyl ethers, copolymers of acrylate ester with acrylic acid, epoxy resins and the like which form a fluid-tight bond between the fibers and the borders of the frames.

When each successive embedded array, positioned in a coated frame, is released before a succeeding frame is placed over it, the adhesive sets (or cures) in two stages. In the first stage the adhesive sets sufficiently to hold the array in place, but not is not fully set (or fully cured). The adhesive bonds the succeeding frame to the array when the adhesive is fully set in the second stage.

When an array is placed over an uncoated frame which is then coated with adhesive in an amount sufficient to embed the fibers, and then covered with a succeeding frame before the fibers in the array are released, the adhesive may be fully cured in a single step.

The number of fibers in an array is arbitrary, typically being in the range from about 10 to about 1000. By way of illustration, if each wafer is 30 cm in diameter, 150 fibers each having an o.d. of 1.0 mm may be used in an array.

Numerous variations in arrangements of stacks, either in parallel or in series, may be contrived depending upon the particular material being treated, the efficiency or degree of separation sought, and the volume of fluid to be treated in a single module. In most applications, banks of modules are used, each containing a single stack of cartridges because the use of plural stacks in a module exposes it to a high risk of failure of seals between stacks.

It will now be evident that the apparatus and basic separation process of this invention may be used in the recovery and separation of a wide variety of commercially significant materials some of which, illustratively referred to, include (a) the recovery of water from brackish or sea water; (b) the recovery and concentration of salts, particularly those of ammonium, the alkali metal and alkaline earth metals such as the halides, sulfates, sulfites nitrates and hydroxides; and organic fluids including glycerine, lactic acid, alcohol, glycols and tanning extracts; (c) ion exchange processes; and, (d) separation of components which normally form azeotropes or have substantially the same boiling points, or ammonia from fluid organic amines; treatment of industrial waste streams such as radioactive waste, sulfite pulps, cannery waste, and the like.

In general any of the foregoing processes will benefit from method of using the module having the structural features described hereinabove. In those processes in which one component of a feedstream is to be separated from at least one other component therein, the feedstream is flowed over the hollow fibers in a direction essentially orthogonal to the plane in which the fibers lie; that portion of the feedstream which permeates the walls of the fibers into the permeate zone is collected and conducted away from the permeate zone; and, concentrate which does not permeate the walls and remains in the feed zone is flowed away from the feed zone and out of the module.

The precise method of sequentially securing one frame upon an array of the last wafer is not narrowly critical provided a fluid-tight seal between the sandwiched fibers and sandwiching frames is effected. The method chosen will depend upon the type of frame used, whether grooved or ungrooved. If grooved, the method chosen will depend upon whether the grooves are dimensioned to provide a high degree of mechanical "grip".

In the most preferred embodiment, the grooves are not dimensioned to provide a high degree of mechanical grip to avoid damaging polymeric membranes. A typical preferred method for constructing a cartridge of wafers from such frames comprises, (i) positioning a first frame to receive an array, (ii) applying enough of a viscous but fluid adhesive to coat the grooves, (iii) placing an array of fibers in the grooves, one fiber to a groove while the fibers are held in spaced-apart relationship, (iv) applying additional adhesive to ensure that it fills the spaces between fibers and cover them, (v) positioning a second frame on the adhesive-coated fibers, and, (vi) waiting until the adhesive is cured sufficiently to secure the fibers in position before releasing their ends.

In another preferred embodiment, the grooves are dimensioned to provide a high degree of mechanical grip without damaging the fibers. A typical preferred method for constructing a cartridge of wafers from such frames comprises, (i) positioning a first frame to receive an array, (ii) placing an array of fibers in the grooves, one fiber to a groove while the fibers are held in spaced-apart relationship, (iii) applying enough of a viscous but fluid adhesive to ensure that it fills the spaces between fibers and cover them, and, (v) positioning a second frame on the adhesive-coated fibers before releasing the ends of the fibers. Though each fiber is gripped in a groove, enough adhesive is drawn around the fiber and into the groove to provide a fluid-tight seal between the fiber and the groove. The ends of the fibers can be released because they are held sufficiently well until the adhesive is essentially completely cured.

The viscosity of the adhesive is preferably in the range from about 10 cps to 1000 cps at room temperature. It will be appreciated that, as described, preferably pre-cut fibers are held in clamping means and trained in each array before they are secured to the frame. When the fibers are released from the clamping means the protruding ends need not be severed as long as they duct permeate into the permeate side of the shell. However, for esthetic reasons, the protruding ends are preferably severed. They may be severed after each successive frame is positioned and secured to the preceding frame. Alternatively, the cartridge may be completed, and then the protruding ends severed at one time.

In a variation of the above procedure, an ultraviolet (UV) light-curable resin is used as the adhesive, and the adhesive distributed over the fibers and first frame after the fibers are positioned over the frame. While still being held in the fiber-positioning clamps, a second frame is positioned over the adhesive-embedded fibers, and the resin then exposed to UV light to cure it. The fibers are then released from the clamps.

In a typical module, the end closures 22 and 23 are removably affixed to each end of the shell because the shell is meant to be reused when the cartridges are replaced. However, a disposable module may be constructed in there is no intention to replace the cartridge(s) or save and reuse the shell. In such a case, the end closure 22 and 23 are fixedly, that is, non-removably secured to the ends of the shell.

The following specific examples are provided to illustrate the use of a module with a specific configuration and fiber packing density to illustrate the flux measured as liters/(meters)$^2$(hr).

In each of the following examples a single cylindrical cartridge is used in a cylindrical module. Each example is run with a cartridge in a module which are each essentially identical to those used in the other. A permanent module was not available; the cartridge was mounted with temporary means; therefore dimensions of the module are not provided.

Each cartridge is constructed with 48 arrays. The angular displacement between successive wafers is 60°. The height of the cartridge is 108 mm and the membrane area 1.426 m$^2$.

Each circular wafer has the following specifications:
o.d.: 188 mm
i.d.: 155 mm
thickness: 2.1 mm
lateral fiber spacing: 2 mm
No. of fibers: 73
Avg. length of fiber: 129 mm
Maximum length of fiber: 155 mm
Minimum length of fiber: 52 mm
Membrane surface area: 0.0297 m$^2$

EXAMPLE 1

Nanofiltration of surface water for potable water

A nanofiltration membrane is typically used to filter surface water containing high concentrations of soluble naturally occurring organic matter such as humic and fulvic acids. These substances cause the water to appear brownish in color and upon chlorination in water treatment facilities, they react to form toxic trihalomethane compounds. These substances are reported to have a molecular weight in the range from 700 to 80,000 (see "Removal of Humic Substances From Natural Water by Reverse Osmosis" by Hallvard Odegaard and Suporn Kootetep, *Water Research*, vol 16, pp 613–620). To simulate such an application, the following test is conducted:

The above-specified cartridge is equipped with a "loose" nanofiltration membrane characterized by 25% NaCl rejection of a 1000 ppm feed solution at 75 psig. The feed-water is made up with reverse-osmosis water and synthetic humic acid such that the observed color level is 200 Pt-Co color units. A color unit is equivalent to 1 mg/L of Pt as chloroplatinate ion. This measurement technique is described in *Standard Method for the*

*Examination of Water and Wastewater* (American Public Health Association, Washington, D.C., publisher).

The results are presented herebelow in tests made with a cartridge of this invention having membranes orthogonal (transverse) to the direction of flow of the feedstream, and the other module with the membranes parallel to the direction of flow in a cartridge having identical membrane specifications, but of conventional design.

The operating pressure is 75 psig and the feed flow rate is 30 gpm. Based on this flow rate the feedstream Reynolds number is 200 (based on the o.d. of the fiber). The rejection values are of color units and the flux is reported in US gal/ft²/24 hr (gfd). To convert to liters/m²/hr, multiply by 1.706.

TABLE II

| Feed water condition | Wafer cartridge transverse flow | | Conventional cartridge parallel flow | |
|---|---|---|---|---|
| | Flux | Rejection | Flux | Rejection |
| Pure water | 70 | — | 70 | — |
| Humic water | | | | |
| 10 min | 60 | 98% | 60 | 98% |
| 24 hr | 45 | 99% | 24 | 99% |

Significantly reduced fouling rates are observed in the transverse flow module compared to the conventional parallel flow module as indicated by the flux after 24 hr of continuous operation. The reduced fouling rate is atttributable to the much higher rate of back diffusion possible when the fibers are oriented transverse to the feedstream.

EXAMPLE 2

Microfiltration of Biological Sludge

Typically conventional hollow fiber membrane modules and spiral wound modules are not used for this application because they become irreversibly fouled and clogged due to the high suspended solids concentrations. Tubular membranes may be used but are about 10 times more expensive to use per unit membrane surface area than the other modular forms.

The cartridge with the above specifications is constructed with a polymeric membrane having pore sizes in the range from 0.1 to 0.25 m$\mu$. The feedstream is an activated sludge with 15 g/L of suspended biological waste solids. The module is operated at a flow rate of 60 gpm and a pressure of 10 psi. The long term steady state flux is observed to be 50 gfd. The permeate is of consistently high quality with turbidity counts of less than 0.1 NTU (Nephelometric Turbidity Unit) indicating nearly 100% rejection of the suspended solids. NTU is a measure of the light scattered at an angle of 90° by particles in the water. It is an EPA-recognized measurement of water clarity.

The foregoing is evidence that the module in transverse flow has the ability to operate on feeds containing high suspended solids concentrations without significant fouling and no clogging of the flow passages over an extended period of time.

In each of the foregoing examples, the essential requirements are that the feedstream be flowed through at least one cartridge in which the fibers are disposed transverse to the direction of flow of the feedstream. The manner in which the successive wafers are made into a cartridge will depend in part upon the pressure at which the cartridge is to operate, the higher the pressure, the more pains taken to ensure a fluid-tight seal between fibers and frames in each successive array. Most preferred for relatively high pressure operation are grooved frames, and enough time is allowed between successive wafers to be sure that the bonding agent secures the fibers and frames on either side thereof, before releasing the fibers.

For lower pressure operation, ungrooved frames may be used and a viscous resin used to seal the fibers between adjacent frames. As stated earlier, the fibers may be released prior to the resin having cured, and a successive frame placed on the still-curing resin provided it is sufficiently compressible to result in a fluid-tight seal without damaging the fibers. By "sufficiently compressible" we mean that the successive frame may be pressed onto the still-curing resin with a pressure in the range from 1 psig to 50 psig depending upon the fragility or compressibility of the fibers.

Having thus provided a general discussion, and specific illustrations of the best mode of constructing a wafer as a repeating unit of a cartridge of wafers, and a module containing at least one cartridge, and preferably a stack of plural cartridges, in which module several separation processes may be carried out, it is to be understood that no undue restrictions are to be imposed by reason thereof except as provided by the following claims.

We claim:

1. A module for use as a membrane device, comprising,
   a shell having entrance and exit passages;
   a pair of end closures with fluid couplings affixed to each of said ends of said shell;
   at least one cartridge disposed within said shell, said cartridge comprising plural repeating units each being a unitary wafer consisting essentially of (i) an array of individual spaced apart hollow fibers of selectively permeable material secured near their opposed terminal portions without potting them, and without being interconnected intermediate said terminal portions, each said array held non-displaceably by said terminal portions in (ii) an unitary frame having a continuous periphery, a through-passage within said frame defining a functionally imperforate border within which said fibers are secured;
   an entrance passage in said shell communicating with said through-passage;
   an exit passage in said shell communicating with said through-passage; and,
   sealing means between said through-passage and said entrance passage, and between said through-passage and said exit passage.

2. The module of claim 1 wherein said hollow fibers have an outside diameter in the range from about 400 $\mu$m to about 2 mm, and a wall thickness in the range from about 5% to 40% of said outside diameter, and said border is sufficiently wide to negate damage to terminal portions of said fibers when subjected to a drag force, produced by a fluid stream flowing transversely over said fibers.

3. The module of claim 2 wherein said frame has a thickness in the range from about 0.5 to about 5 times the outside diameter of said fibers, said frame includes through-passages for mounting means, and is formed from a synthetic resinous stock.

4. The module of claim 2 wherein a feedstream is flowed through said entrance passage, concentrate is removed from said exit passage, each array of fibers discharges permeate in opposite directions into a permeate zone, so that permeate is discharged in directions in a plane orthogonal to the longitudinal axis of said cartridge, and said shell includes means to remove said permeate from said permeate zone.

5. The module of claim 4 wherein the void fraction within said cartridge is in the range from about 0.3 to about 0.95, and said fibers are held in said wafers by terminal portions which range from about 4% to about 20% of the overall length of the fibers.

6. The module of claim 5 wherein said fibers are essentially free from contact, one with another, in each array, and from one array to another, except during flow of fluid through said cartridge under flow conditions sufficient to produce a sag in said fibers.

7. The module of claim 1 wherein said cartridge is disposed in said shell so that the peripheral surface of said cartridge is spaced apart from said shell's inner surface to provide a channel for fluid, without mounting means inserted through said wafers.

8. The module of claim 1 wherein said terminal portions are secured with an adhesive having an initial cure time in the range from about 1 second to about 1 minute, after which initial cure the adhesive is compressible.

9. The module of claim 1 wherein said terminal portions are secured with an adhesive having a setting time in the range from about 1 second to about 1 minute.

10. The module of claim 1 wherein said pair of end closures are removably affixed to each of said ends of said shell, and said module is disposable.

11. The module of claim 1 wherein said unitary frame is a laminar frame, and said terminal portions are disposed, each individually, in a multiplicity of chord-wise laterally spaced apart aligned grooves in opposed portions of said border and in the same plane, each groove adapted to embrace a terminal portion of one of said hollow fibers.

12. The module of claim 11 wherein said laminar frame is a ring.

13. The module of claim 11 wherein said laminar frame is a rectangular ring.

14. The module of claim 11 wherein said frame has a thickness in the range from about 1.5 to about 5 times the outside diameter of said fibers, and is formed from a synthetic resinous stock.

15. The module of claim 1 wherein plural cartridges are coaxially aligned and secured in fluid-tight relationship.

16. The module of claim 1 wherein said cartridge is removably disposed within said shell.

17. A method for forming a cartridge for use in a membrane device, said cartridge comprising plural repeating units of wafers each consisting essentially of a unitary frame and an array of hollow fibers which are not potted, said method comprising,
(i) positioning a first frame having a passage therein and a border defined by the passage;
(ii) coating said border with an adhesive;
(iii) training all fibers in an array in coplanar, parallel, spaced-apart relationship onto opposed portions of the frame's border;
(iv) initially curing said adhesive sufficiently to hold said terminal portions in position;
(v) positioning a second frame and securing it to said first frame with said array held therebetween;
(vi) repeating steps (ii) to (v) with successive frames until a predetermined number of arrays have b sequentially secured in position, each in fluid-tight relationship with the last prior array; and,
(vii) capping the last-positioned array with an end frame to complete said cartridge which, is non-disassemblable.

18. The method of claim 17 wherein each said wafer is set in fluid-tight relationship with the last prior wafer, within 5 minutes.

19. The method of claim 18 wherein, after securing said second frame to said first frame in step (v), severing protruding ends of fibers.

20. The method of claim 18 wherein, after capping the last-positioned array with an end frame in step (vii), severing protruding ends of fibers.

21. A method for forming a cartridge for use in a membrane device, said cartridge comprising plural repeating units of wafers each consisting essentially of a unitary laminar frame having a border and a multiplicity of chord-wise laterally spaced apart, aligned grooves in opposed portions of said border, and an array of hollow fibers which are not potted, said method comprising,
(i) positioning a first frame;
(ii) to (v) with successive frames training all fibers in an array in coplanar, parallel, spaced-apart relationship into said grooves of opposed portions of said border;
(iii) coating said border with an adhesive after step (ii);
(iv) positioning a second frame and adhesively securing it to said first frame with said array held therebetween;
(v) curing said adhesive to hold said terminal portions in position;
(vi) repeating steps (ii) until a predetermined number of arrays have been sequentially secured in position, each in fluid-tight relationship with the last prior array; and,
(vii) capping the last-positioned array with an end frame to complete said cartridge which is non-disassemblable.

22. The method of claim 21 wherein each said wafer is set in fluid-tight relationship with the last prior wafer, within less than 5 minutes.

23. A method for forming a cartridge for use in a membrane device, said cartridge comprising plural repeating units of wafers each consisting essentially of a unitary laminar frame having a border and a multiplicity of chord-wise laterally spaced apart, aligned grooves in opposed portions of said border, and an array of hollow fibers which are not potted, said method comprising,
(i) positioning a first frame;
(ii) coating said border with an adhesive;
(iii) training all fibers in an array in coplanar, parallel, spaced-apart relationship into said grooves of opposed portions of said border after step (ii);
(iv) coating said fibers in said border with additional adhesive;
(v) positioning a second frame and adhesively securing it, to said first frame with said array held therebetween;
(vi) curing said adhesive to hold said terminal portions in position;
(vii) repeating steps (ii) to (v) with successive frame until a predetermined number of arrays have been sequentially secured in position, each in fluid-tight relationship with the last prior array; and, (viii) capping the last-positioned array with an end frame to complete said cartridge which is non-disassemblable.

24. The method of claim 23 wherein each said wafer is set in fluid-tight relationship with the last prior wafer, within less than 5 minutes.

25. In a cartridge to be inserted in a module for use in a membrane device, the improvement comprising, plural repeating units, each being a unitary wafer consisting essentially of
   (i) an array of individual spaced apart hollow fibers of selectively permeable material secured near their opposed terminal portions without potting them, and without being interconnected intermediate said terminal portions, each said array held non-displaceably by said terminal portions in
   (ii) a unitary laminar frame having a continuous periphery, a through-passage within said frame defining a functionally imperforate border within which said fibers are secured; and,
   an end frame secured in fluid-tight relationship with the last array,
   whereby each array is sandwiched between an upper and a lower frame so that a predetermined number of arrays "n" have been sequentially secured in position, each in fluid-tight relationship with the last prior array, and capped by said end frame, so that the number of arrays held between successive frames is one less than the number of frames in which the fibers are held, where n represents an integer greater than 2.

26. The cartridge of claim 25 wherein,
   (i) said through-passage within a multiplicity of said frames provides a fluid-tight axial conduit having open ends; said fibers have bores in open fluid communication outside said cartridge, said bores being disposed so as to duct fluid in opposite directions;
   (ii) each of said opposed portions of said border has lateral grooves which provide a through-passage in the plane of the fibers, said grooves being adapted snugly to embrace terminal end portions of each fiber so that fibers of an array lie in parallel space-apart relationship in a plane substantially orthogonal to said axial conduit, and the fibers of one array lie transversely to those of another array.

27. The unitary cartridge of claim 26 wherein,
   (i) each opposed portion of said border has a width sufficient to negate damage to terminal portions of said fibers when subjected to a drag force produced by a feedstream flowing axially within said through-passage;
   (ii) the number of said grooves in each said opposed portion of said border are equal to the number of said fibers, each groove having an arcuate profile adapted to snugly embrace a corresponding arcuate portion of one of said fibers near one of its ends;
   (iii) said grooves in one of said opposed portions of said border are spaced apart with the same spacing as each groove in the other of said opposed portions of said border; and,
   said fibers are secured within said opposed portions of said border with
   (iv) bonding means to bond said terminal portions of said fibers to said laminar frame in at least near-fluid-tight relationship.

28. The cartridge of claim 27 wherein said fibers have an outside diameter in the range from about 100 $\mu$m to about 10 mm, and a wall thickness in the range from about 5% to about 40% of said outside diameter.

29. The cartridge of claim 28 wherein said fibers are made from an organic polymeric material, a fiber having an outside diameter in the range from about 0.1 mm to 2 mm.

30. The cartridge of claim 28 wherein said fibers are made from an inorganic material, a fiber having an outside diameter in the range from about 3 mm to 13 mm.

* * * * *